United States Patent
Ramsey et al.

(10) Patent No.: US 11,397,578 B2
(45) Date of Patent: Jul. 26, 2022

(54) SELECTIVELY DISPATCHING WAVES BASED ON ACCUMULATORS HOLDING BEHAVIORAL CHARACTERISTICS OF WAVES CURRENTLY EXECUTING

(71) Applicant: ADVANCED MICRO DEVICES, INC., Santa Clara, CA (US)

(72) Inventors: Randy Ramsey, Orlando, FL (US); William David Isenberg, Orlando, FL (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/556,611

(22) Filed: Aug. 30, 2019

(65) Prior Publication Data
US 2021/0064366 A1    Mar. 4, 2021

(51) Int. Cl.
*G06F 9/38* (2018.01)
*G06F 9/30* (2018.01)
*G06F 7/498* (2006.01)

(52) U.S. Cl.
CPC ............ *G06F 9/3001* (2013.01); *G06F 7/498* (2013.01); *G06F 9/3836* (2013.01); *G06F 9/3851* (2013.01); *G06F 2207/3888* (2013.01)

(58) Field of Classification Search
CPC ... G06F 9/3851; G06F 9/3887; G06F 15/8007
See application file for complete search history.

(56) References Cited

U.S. PATENT DOCUMENTS

| | | | | |
|---|---|---|---|---|
| 8,578,387 | B1* | 11/2013 | Mills | G06F 9/5044 |
| | | | | 718/105 |
| 2011/0173414 | A1* | 7/2011 | Juffa | G06F 9/3455 |
| | | | | 712/22 |
| 2012/0194527 | A1* | 8/2012 | Hartog | G06F 9/3851 |
| | | | | 345/503 |
| 2013/0268715 | A1* | 10/2013 | Fetterman | G06F 9/3887 |
| | | | | 711/5 |
| 2016/0132338 | A1* | 5/2016 | Jin | G06F 9/30058 |
| | | | | 712/206 |

(Continued)

OTHER PUBLICATIONS

"AMD Graphics Cores Next (GCN) Architecture" AMD White Paper, Jun. 2012, 18 pages.

*Primary Examiner* — Jacob Petranek (57) ABSTRACT

An apparatus such as a graphics processing unit (GPU) includes a plurality of processing elements configured to concurrently execute a plurality of first waves and accumulators associated with the plurality of processing elements. The accumulators are configured to store accumulated values representative of behavioral characteristics of the plurality of first waves that are concurrently executing on the plurality of processing elements. The apparatus also includes a dispatcher configured to dispatch second waves to the plurality of processing elements based on comparisons of values representative of behavioral characteristics of the second waves and the accumulated values stored in the accumulators. In some cases, the behavioral characteristics of the plurality of first waves comprise at least one of fetch bandwidths, usage of an arithmetic logic unit (ALU), and number of export operations.

20 Claims, 6 Drawing Sheets

(56) References Cited

U.S. PATENT DOCUMENTS

2016/0180487 A1* 6/2016 Trawczynski ............ G06T 1/20
 345/505
2017/0286168 A1* 10/2017 Simpson ................. G06F 9/505
2020/0183597 A1* 6/2020 Das ....................... G06F 3/0625

* cited by examiner

SELECTIVELY DISPATCHING WAVES BASED ON ACCUMULATORS HOLDING BEHAVIORAL CHARACTERISTICS OF WAVES CURRENTLY EXECUTING

BACKGROUND

Graphics processing units (GPUs) and other multithreaded processing units typically implement multiple processing elements (which are also referred to as processor cores or compute units) that concurrently execute multiple instances of a single program on multiple data sets. The instances are referred to as threads or waves. Several waves are created (or spawned) and then dispatched to each processing element in a multithreaded processing unit. The processing unit can include hundreds of processing elements so that thousands of waves are concurrently executing programs in the processing unit. The processing elements in a GPU typically process three-dimensional (3-D) graphics using a graphics pipeline formed of a sequence of programmable shaders and fixed-function hardware blocks. For example, a 3-D model of an object that is visible in a frame can be represented by a set of primitives such as triangles, other polygons, or patches which are processed in the graphics pipeline to produce values of pixels for display to a user. In a multithreaded GPU, the waves execute different instances of the shaders to perform calculations on different primitives concurrently or in parallel. The GPU also executes asynchronous computations on the processing elements. In some cases, shaders and asynchronous computations execute concurrently on the same processing element.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Waves that are executing concurrently in a multithreaded processing unit share some of the resources of the processing elements. Shared resources include vector general-purpose registers (VGPRs) or scalar GPRs that store state information for the waves such as intermediate results of operations, local data stores (LDSs) that are used to store data for the waves, and the like. A conventional GPU therefore limits the number of waves that are dispatched to each processing element based on the physical resources of the processing elements. For example, a wave is dispatched to a processing element as long as a number of unallocated VGPRs available at the processing unit is more than a number of VGPRs requested by the wave. The wave is delayed or stalled if the number of unallocated VGPRs is less than the requested number of VGPRs. Other techniques are also used to limit the number of concurrent waves based on the physical resources of a processing element, such as compute unit masks, wave limit controls, and priority arbitration controls. However, processing elements can become over-occupied even when the GPU implements workload balancing using physical resources. For example, the bandwidth available to fetch information from a cache or memory can be insufficient to support a set of pixel shaders concurrently executing on a processing element even though the processing element includes a sufficient number of VGPRs to store intermediate results for the concurrent pixel shaders.

FIGS. 1-6 disclose techniques for providing enhanced workflow control to software developers (or compilers/drivers) by accumulating values that represent behavioral characteristics of waves concurrently executing on a processing element in a graphics processing unit (GPU). A wave is selectively launched (e.g., dispatched for execution) on the processing element based on a value representative of the behavioral characteristic of the wave, the accumulated values of the behavioral characteristic for waves that are concurrently executing on the processing element, and a maximum accumulated value of the behavioral characteristic for the processing element. In some embodiments, the values represent behavioral characteristics such as a fetch bandwidth used by the wave, usage of an arithmetic logic unit (ALU), a number of export operations, and the like. The values of the behavioral characteristics of the waves are estimated by software developers or using heuristics implemented in a compiler or driver for the processing element. The wave is launched if the value for the subsequent wave plus the accumulated values for the concurrently executing waves is less than the maximum accumulated value for the processing element. Otherwise, the wave is delayed or stalled until one or more of the concurrently executing waves completes and frees a portion of the maximum accumulated value.

Some embodiments of the GPU include counters that represent the accumulated values for corresponding processing elements in the GPU. The counters associated with a processing element are incremented or decremented by an amount equal to the values for a wave in response to the wave being launched for execution on the processing element or completing execution on the processing element, respectively. A wave is selectively launched on a processing element based on a comparison of the value of the counter in the processing element and a value representative of the behavioral characteristic of the wave. For example, if the maximum counter value for the processing element is 100 and the accumulated counter value is 75 for the concurrently executing waves, a subsequent wave is launched if its value for the behavioral characteristic (e.g., the value provided by the developer or estimated using a heuristic) is less than or equal to 25. In some embodiments, multiple counters are used to accumulate values for different wave types, e.g., a first counter is used to accumulate values for pixel shader waves and a second counter is used to accumulate the values for vertex shader waves. In some embodiments, multiple counters are used to accumulate values for different behavioral characteristics such as fetch bandwidth, ALU usage, and export operations. Waves are then selectively launched based on the accumulated values for the multiple behavioral characteristics. Some embodiments of the GPU preferentially launch waves on one of a set of processing elements based on the accumulated values associated with the processing elements in the set. For example, processing elements having higher accumulated values are given correspondingly lower priorities for launching subsequent waves.

Figure 1:
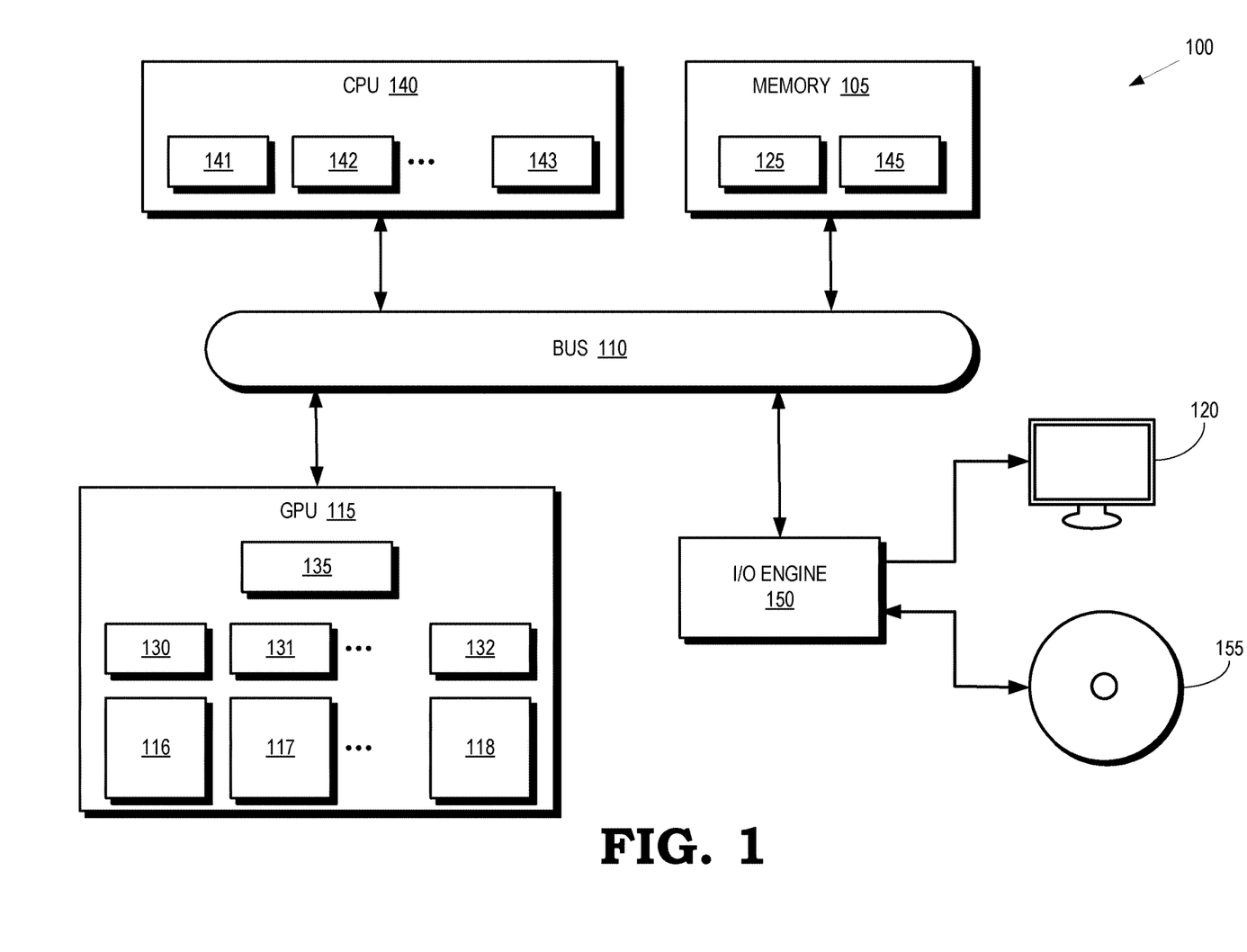
FIG. 1 is a block diagram of a processing system according to some embodiments.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing, e.g., when implemented or used as a general-purpose graphics processing unit (GPGPU). In the illustrated embodiment, the GPU 115 implements multiple processing elements 116, 117, 118 (collectively referred to herein as "the processing elements 116-118") that are configured to execute instructions concurrently or in parallel. The processing elements 116-118 are also referred to as compute units or processor cores. In some embodiments, each of the processing elements 116-118 includes multiple processing elements that operate according to single-instruction-multiple-data (SIMD) protocols to concurrently execute the same instruction on multiple data sets using multiple processor cores. The smallest processing elements are therefore referred to as SIMD units. A hierarchical execution model is used to match the hierarchy implemented in hardware. The execution model defines a kernel of instructions that are executed by all the waves (also referred to as wavefronts, threads, streams, or work items). In some cases, the threads are dependent on each other. The threads are grouped into workgroups for concurrent execution on corresponding processing elements 116-118. Threads within a workgroup are able to share data with each other.

In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 125 of instructions from a program code that is to be executed by the GPU 115.

The GPU 115 selectively launches waves for execution on the processing elements 116-118 based on accumulated values that represent behavioral characteristics of waves that are concurrently executing on one or more of the processing elements 116-118. In the illustrated embodiment, the GPU 115 includes accumulators 130, 131, 132 (collectively referred to herein as "the accumulators 130-132") associated with the processing elements 116-118, respectively. The accumulators 130-132 store accumulated values representative of behavioral characteristics of waves that are concurrently executing on the plurality of processing elements. In some embodiments, the behavioral characteristics include one or more of a fetch bandwidth available to fetch instructions, usage of an arithmetic logic unit (ALU), a number of export operations, and the like. In some embodiments, the accumulators 130-132 include counters for each of the SIMD units in the processing elements 116-118. However, accumulators can be implemented at different levels in the processing hierarchy of the GPU 115. For example, accumulators can be implemented at the workgroup level, processing element level, SIMD level, or any combination thereof. Moreover, multiple accumulators can be associated with each processing entity to account for different behavioral characteristics of the waves.

Prior to launch on the processing elements 116-118, waves are assigned values of the behavioral characteristics, e.g., by a software developer or according to a heuristic implemented by the GPU 115. A dispatcher 135 dispatches waves to the processing elements 116-118 based on comparisons of the values representative of behavioral characteristics of the waves and the accumulated values stored in the accumulators 130-132. Some embodiments of the accumulators 130-132 have corresponding maximum values and the dispatcher 135 available portions of the accumulators 130-132 that are equal to differences between the maximum values and the values stored in the accumulators 130-132. The dispatcher 135 launches the waves in response to the assigned value of the behavioral characteristics being less than or equal to the available portion of one of the accumulators 130-132. The dispatcher 135 stalls the waves in response to the assigned value of the behavioral characteristics being greater than the available portions of the accumulators 130-132. The accumulators 130-132 are incremented in response to a wave launching on the corresponding processing elements 116-118 and decremented in response to the waves completing execution.

Some embodiments of the dispatcher 135 selectively launch waves on one or more of the processing elements 116-118 based on priorities associated with the processing elements 116-118. The priorities are assigned based on values stored in the accumulators 130-132. For example, a higher priority is assigned to the processing element 116 (or a SIMD unit therein) if the corresponding accumulator 130 has a lower value that indicates higher availability of resources. A lower priority is assigned to the processing element 117 (or a SIMD unit therein) if the corresponding accumulator 131 has a higher value that indicates lower availability of resources. The dispatcher 135 therefore preferentially launches a wave on the processing element 116 that has the higher priority and therefore the higher availability of resources.

The processing system 100 also includes a central processing unit (CPU) 140 that implements multiple processing elements 141, 142, 143, which are collectively referred to herein as "the processing elements 141-143." The processing elements 141-143 are configured to execute instructions concurrently or in parallel. The CPU 140 is connected to the bus 110 and can therefore communicate with the GPU 115 and the memory 105 via the bus 110. The CPU 140 can execute instructions such as program code 145 stored in the memory 105 and the CPU 140 can store information in the memory 105 such as the results of the executed instructions.

The CPU 140 is also able to initiate graphics processing by issuing draw calls to the GPU 115. Some embodiments of the CPU 140 implement accumulators and a dispatcher (not shown in FIG. 1 in the interest of clarity) that operate in the same or similar manner as the accumulators 130-132 and the dispatcher 135 implemented in the GPU 115.

An input/output (I/O) engine 150 handles input or output operations associated with the display 120, as well as other elements of the processing system 100 such as keyboards, mice, printers, external disks, and the like. The I/O engine 150 is coupled to the bus 110 so that the I/O engine 150 is able to communicate with the memory 105, the GPU 115, or the CPU 140. In the illustrated embodiment, the I/O engine 150 is configured to read information stored on an external storage component 155, which is implemented using a non-transitory computer readable medium such as a compact disk (CD), a digital video disc (DVD), and the like. The I/O engine 150 can also write information to the external storage component 155, such as the results of processing by the GPU 115 or the CPU 140.

Figure 2:
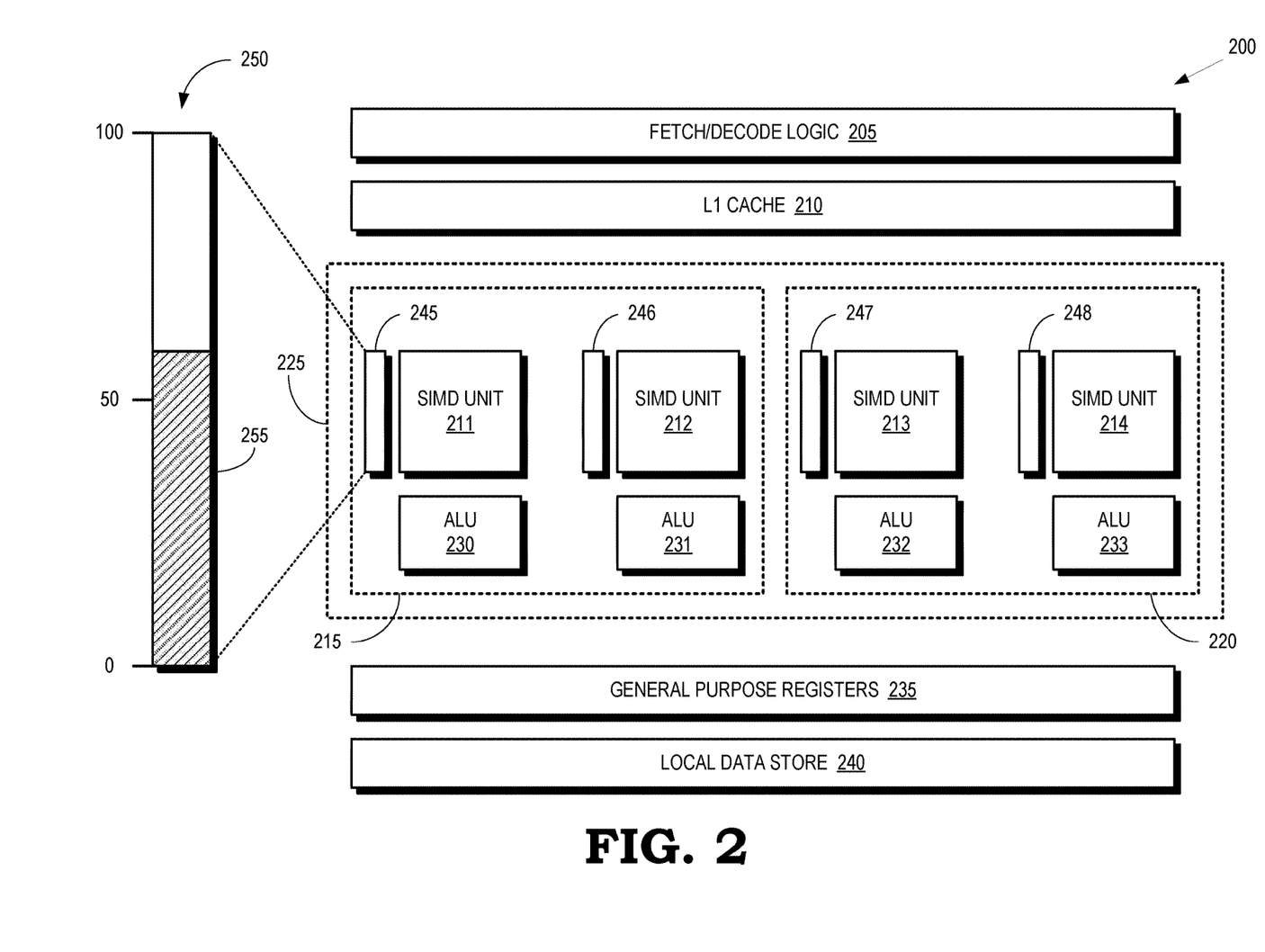
FIG. 2 is a block diagram of a processing element according to some embodiments.

FIG. 2 is a block diagram of a processing element 200 according to some embodiments. The processing element 200 is used to implement some embodiments of the processor cores 116-118, 141-143 shown in FIG. 1. The processing element 200 includes fetch/decode logic 205 that fetches and decodes instructions in the waves of the workgroups that are scheduled for execution by the processing element 200. Some embodiments of the processing element 200 execute waves in a workgroup. For example, the fetch/decode logic 205 can fetch a kernel of instructions that are executed by all the waves in the workgroup. The fetch/decode logic 205 then decodes the instructions in the kernel. The processing element 200 also includes a cache such as an L1 cache 210 that is used to store local copies of data and instructions that are used during execution of the waves.

A plurality of SIMD units 211, 212, 213, 214 (collectively referred to herein as "the SIMD units 211-214") are used to execute threads of the workgroup concurrently or in parallel. For example, the SIMD units 211-214 can execute instructions in the same kernel using different input data to generate different output results. In some embodiments, the SIMD units 211-214 are partitioned into compute units 215, 220, which can form another level of hierarchy that is referred to herein as a workgroup processor 225. The SIMD units 211-214 are each associated with arithmetic logic units (ALUs) 230, 231, 232, 233 (collectively referred to herein as "the ALUs 245-248") that perform arithmetic operations for instructions executing on the SIMD units 211-214.

General purpose registers (GPRs) 235 are used to store information that defines contexts of the corresponding SIMD units 211-214 while executing instructions in a thread. The GPRs 235 include vector general purpose registers (VGPRs) and scalar GPRs. Values are stored in the GPRs 235 in response to waves being scheduled for execution on the SIMD units 211-214. The values can be modified by the SIMD units 211-214 to reflect the changing context of the SIMD units 211-214 in response to execution of instructions on the SIMD units 211-214. The values stored in the GPRs 235 are copied to an external memory (such as the memory 105 shown in FIG. 1). The values are then erased from the GPRs 235 (or written over by new context information for a different instruction or workgroup) in response to preemption of instructions or workgroups executing in the processing element 200.

A local data store 240 is used to store data that is generated by or used by the SIMD units 211-214. Some embodiments of the local data store 240 are partitioned to provide separate regions for each of the SIMD units 211-214. The local data store 240 is also used to facilitate exchange or sharing of data between the SIMD units 211-214. For example, producer waves generate an output and consumer waves use (or "consume") the output. Producer-consumer waves within a workgroup executing on the processing element 200, e.g., on the workgroup processor 225, share data via the local data store 240. Data associated with waves of a workgroup is stored in the local data store 240 in response to waves being scheduled for execution on the SIMD units 211-214 in the workgroup processor 225. In some embodiments, the information stored in the local data store 240 is modified in response to execution of instructions by the SIMD units 211-214. Information in the local data store 240 that is associated with waves or workgroups executing on the SIMD units 211-214 is written to an external memory (such as the memory 105 shown in FIG. 1) in response to preemption of the wave or workgroup.

Accumulators 245, 246, 247, 248 (collectively referred to herein as "the accumulators 245-248") are associated with the SIMD units 211-214, respectively. In some embodiments, the accumulators 245-248 are implemented as counters. Although a single accumulator 245-248 is shown for each of the SIMD units 211-214, multiple accumulators can be associated with each of the SIMD units 211-214 to accumulate values indicative of behavioral characteristics of the waves executing on the SIMD units 211-214. In some embodiments, additional accumulators are associated with the compute units 215, 220, the workgroup processor 225, combinations thereof, or other entities.

The accumulator 245 is shown in an exploded view 250 that depicts a value 255 (indicated by the hashed region) of the accumulator 230. The values of the accumulator 245 range from 0 to a maximum value of 100 in FIG. 2, but other ranges of values and other maximum values are used in other embodiments. The value 255 indicates the accumulated values that represent behavioral characteristics for one or more waves that are concurrently executing on the SIMD unit 211. As discussed herein, a dispatcher (such as the dispatcher 135 shown in FIG. 1) selectively launches a wave for execution on the SIMD unit 211 based upon a comparison of a value of a behavioral characteristic of the wave to the available space in the accumulator 245, e.g., a difference between the accumulated value 255 and the maximum value for the accumulator 245.

In some embodiments, priorities are assigned to the SIMD units 211-214 based on the values in the corresponding accumulators 245-248. For example, a higher priority is assigned to the SIMD unit 212 and a relatively lower priority is assigned to the SIMD unit 211 if the value in the accumulator 245 is larger than the value in the accumulator 246, indicating greater availability of resources in the SIMD unit 212 than in the SIMD unit 211. Waves are then selectively launched on one of the SIMD units 211-214 based on the relative priorities. For example, a wave is launched on the SIMD unit 211 if the SIMD unit 211 has a higher priority than the SIMD units 212-214 and a comparison of availability in the accumulator 245 and a value representative of a behavioral characteristic of the wave indicates that there are sufficient resources available on the SIMD unit 211.

Figure 3:
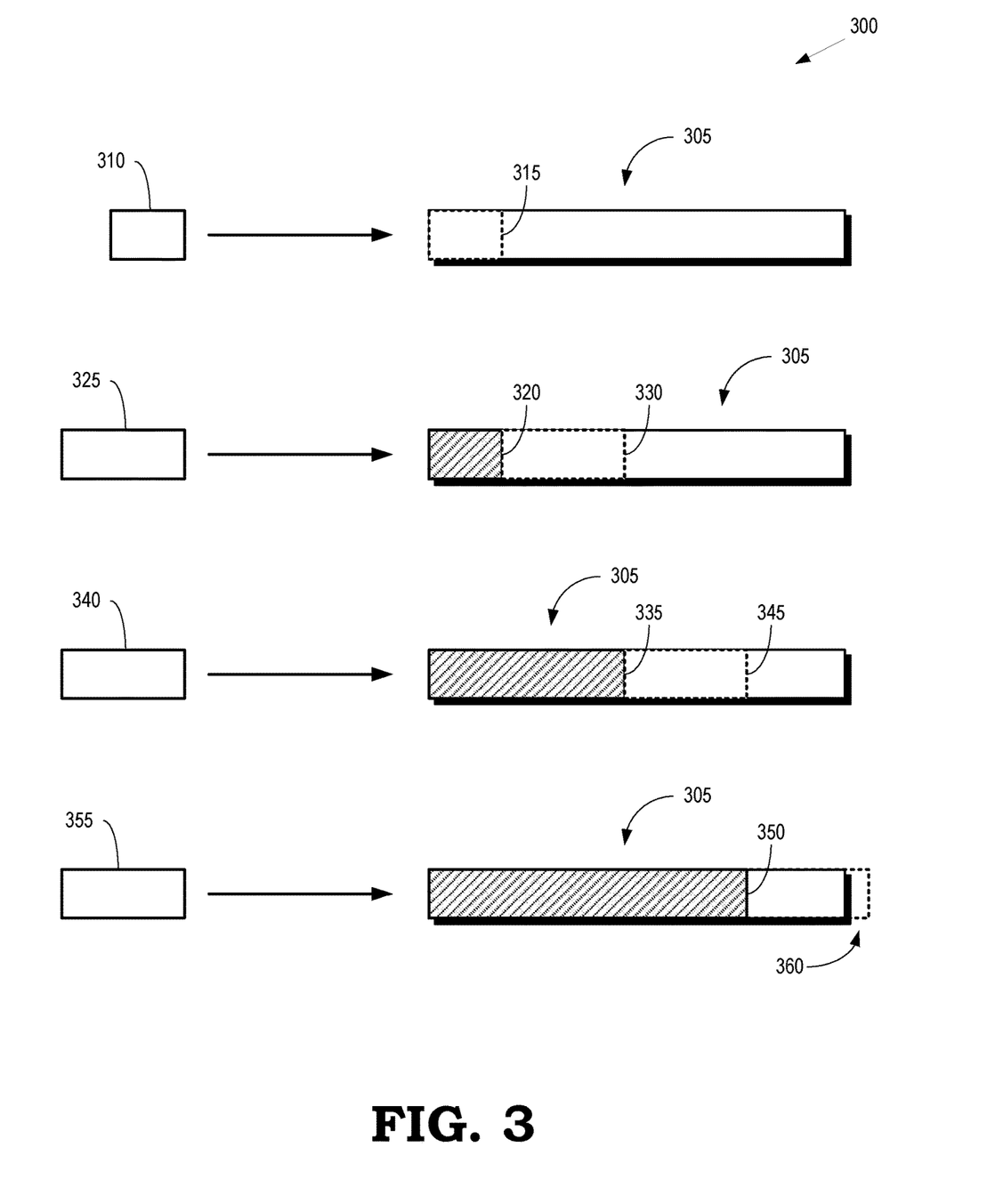
FIG. 3 is a block diagram of a sequence of behavioral characteristic values accumulated by an accumulator according to some embodiments.

FIG. 3 is a block diagram of a sequence 300 of behavioral characteristic values accumulated by an accumulator 305 according to some embodiments. The accumulator 305 is used to implement some embodiments of the accumulators 130-132 shown in FIG. 1 and the accumulators 245-248 shown in FIG. 2.

Initially, the accumulator 305 has a value of zero because there are no waves executing on the corresponding processing element, which could be a compute unit, processor core, SIMD unit, or other processing entity or group of processing entities. A dispatcher (such as the dispatcher 135 shown in FIG. 1) determines a value 310 representative of a behavioral characteristic of a first wave that is being considered for dispatch to the processing element. The value 310 is determined by a software developer, a heuristic implemented in the dispatcher or corresponding GPU, or using other techniques. The dispatcher compares the value 310 to the available space in the accumulator 305, as indicated by the dashed box 315. The comparison indicates that there is available space and the dispatcher launches the first wave for execution on the processing element.

At the next time interval, the first wave is executing on the processing element and the accumulator 305 has an accumulated value 320 corresponding to the value 310 for the first wave. The dispatcher determines a value 325 representative of a behavioral characteristic of a second wave that is being considered for dispatch to the processing element. The dispatcher compares the value 325 to the available space in the accumulator 305, as indicated by the dashed box 330. The comparison indicates that there is available space and the dispatcher launches the second wave for execution on the processing element.

At the next time interval, the first and second waves are executing on the processing element and the accumulator 305 has an accumulated value 335 corresponding to a sum of the value 310 for the first wave and the value 325 for the second wave. The dispatcher determines a value 340 representative of a behavioral characteristic of a third wave that is being considered for dispatch to the processing element. The dispatcher compares the value 340 to the available space in the accumulator 305, as indicated by the dashed box 345. The comparison indicates that there is available space and the dispatcher launches the third wave for execution on the processing element.

At the next time interval, the first, second, and third waves are executing on the processing element and the accumulator 305 has an accumulated value 350 corresponding to a sum of the value 310 for the first wave, the value 325 for the second wave, and the value 340 for the third wave. The dispatcher determines a value 355 representative of a behavioral characteristic of a fourth wave that is being considered for dispatch to the processing element. The dispatcher compares the value 355 to the available space in the accumulator 305 and the comparison indicates that there is insufficient available space in the accumulator 305, as indicated by the dashed box 360. The dispatcher therefore stalls the fourth wave until sufficient space is available in the accumulator 305, e.g., due to completion of the first, second, or third waves.

Figure 4:
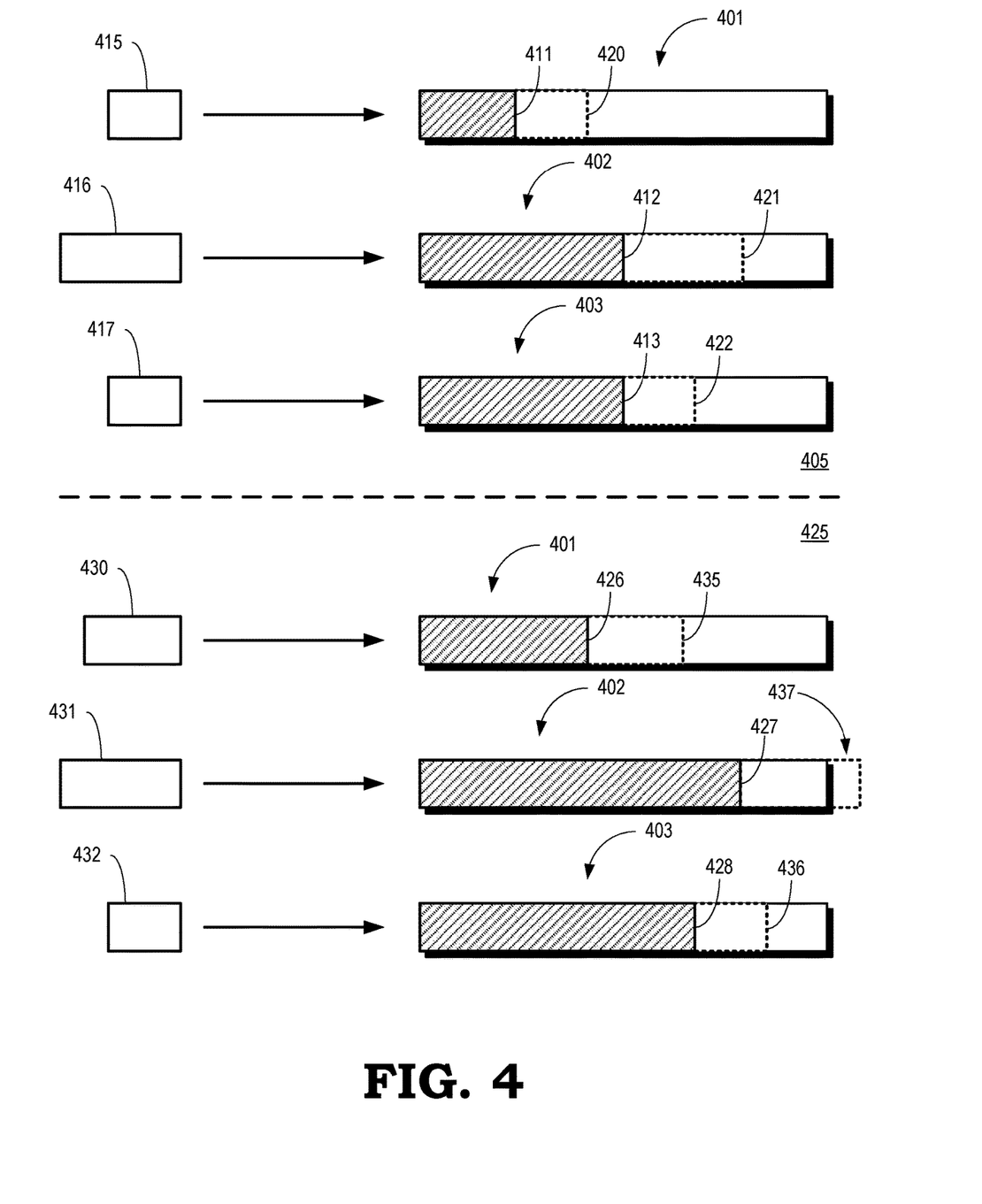
FIG. 4 is a block diagram of a sequence of behavioral characteristic values accumulated by a set of accumulators that are associated with different behavioral characteristics according to some embodiments.

FIG. 4 is a block diagram of a sequence of behavioral characteristic values accumulated by a set of accumulators that are associated with different behavioral characteristics according to some embodiments. The set of accumulators includes the accumulators 401, 402, 403, which are used to implement some embodiments of the accumulators 130-132 shown in FIG. 1 and the accumulators 245-248 shown in FIG. 2. The accumulators 401, 402, 403 are collectively referred to herein as "the accumulators 401-403."

At a first time interval 405, one or more waves are concurrently executing on the processing element and the accumulators 401-403 have accumulated values corresponding to the behavioral characteristics of the waves. The accumulator 401 for a first behavioral characteristic has an accumulated value 411, the accumulator 402 for a second behavioral characteristic has an accumulated value 412, and the accumulator 403 for a third behavioral characteristic has an accumulated value of 413. A dispatcher determines values 415, 416, 417 that are representative of corresponding behavioral characteristics of a first wave that is being considered for dispatch to the processing element. The dispatcher compares the values 415-417 to the available space in the accumulators 401-403, as indicated by the dashed boxes 420, 421, 422. The comparison indicates that there is available space in the accumulators 401-403 and the dispatcher launches the first wave for execution on the processing element.

At a second time interval 425, one or more waves (including the first wave) are concurrently executing on the processing element and the accumulators 401-403 have accumulated values corresponding to the behavioral characteristics of the waves. The accumulator 401 has an accumulated value 426, the accumulator 402 has an accumulated value 427, and the accumulator 403 has an accumulated value of 428. A dispatcher determines values 430, 431, 432 that are representative of corresponding behavioral characteristics of a second wave that is being considered for dispatch to the processing element. The dispatcher compares the values 430-432 to the available space in the accumulators 401-403. The dispatcher determines that there is sufficient space in the accumulator 401 and the accumulator 403, as indicated by the dashed boxes 435, 436. However, the comparison indicates that the accumulator 402 does not have sufficient space to accommodate the value 431 of the second behavioral characteristic associated with the wave, as indicated by the dashed box 437. Consequently, the dispatcher stalls the second wave until sufficient space becomes available on all of the accumulators 401-403.

Figure 5:
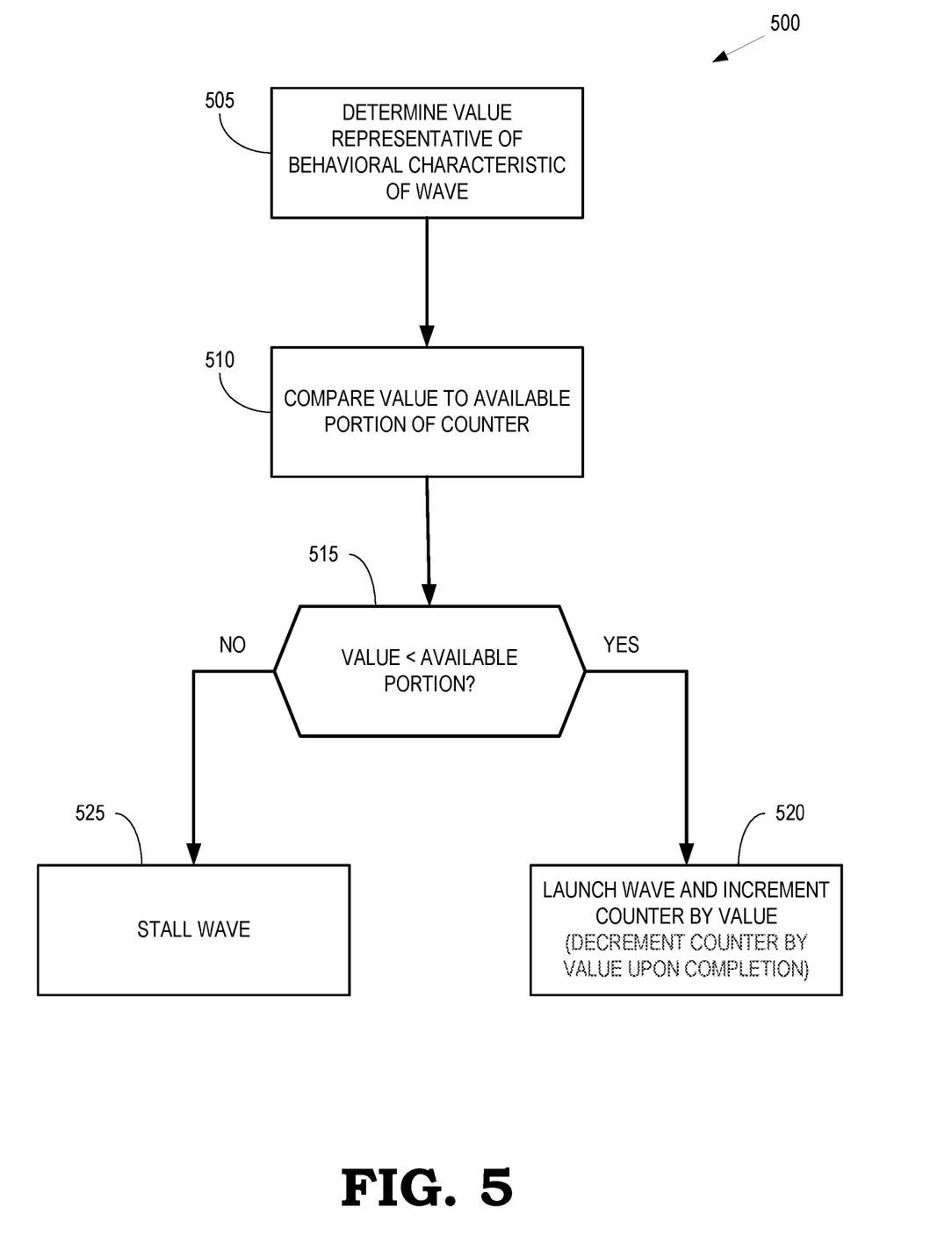
FIG. 5 is a flow diagram of a method of selectively launching or stalling a wave based on behavioral characteristics of the wave according to some embodiments.

FIG. 5 is a flow diagram of a method 500 of selectively launching or stalling a wave based on behavioral characteristics of the wave according to some embodiments. The method is implemented in some embodiments of the dispatcher 135 shown in FIG. 1.

At block 505, the dispatcher determines a value representative of one or behavioral characteristics of a wave that is being considered for dispatch to a processing element. The values of the behavioral characteristics are determined based on information provided by a software developer or using a heuristic to determine the value based on other characteristics of instructions executed by the wave.

At block 510, the dispatcher compares the value to an available portion of a counter that is used to implement an accumulator associated with the processing element or, if multiple behavioral characteristics are being compared, the corresponding values are compared to the available portions of the counter. In some embodiments, the dispatcher determines the available portion as being equal to a difference between a maximum value of the counter and accumulated values for other waves that are concurrently executing on the processing element.

At block 515, the dispatcher determines whether the value is less than the available portion of the accumulator or, if multiple behavioral characteristics are being compared, the dispatcher determines whether the values for the wave are less than the available portions of the corresponding accumulators. If so, the method 500 flows to block 520. If the value is greater than or equal to the available portion or, if multiple behavioral characteristics are being compared, if one or more of the values is greater than or equal to the available portion, the method 500 flows to block 525.

At block 520, the dispatcher launches the wave for execution on the processing element. The accumulator is then incremented by an amount equal to the value for the wave or, in the case of multiple behavioral characteristics, the accumulators are incremented by an amount equal to the corresponding values for the wave. At block 525, the dispatcher stalls the wave until sufficient portions of the accumulators are available to support the wave.

Figure 6:
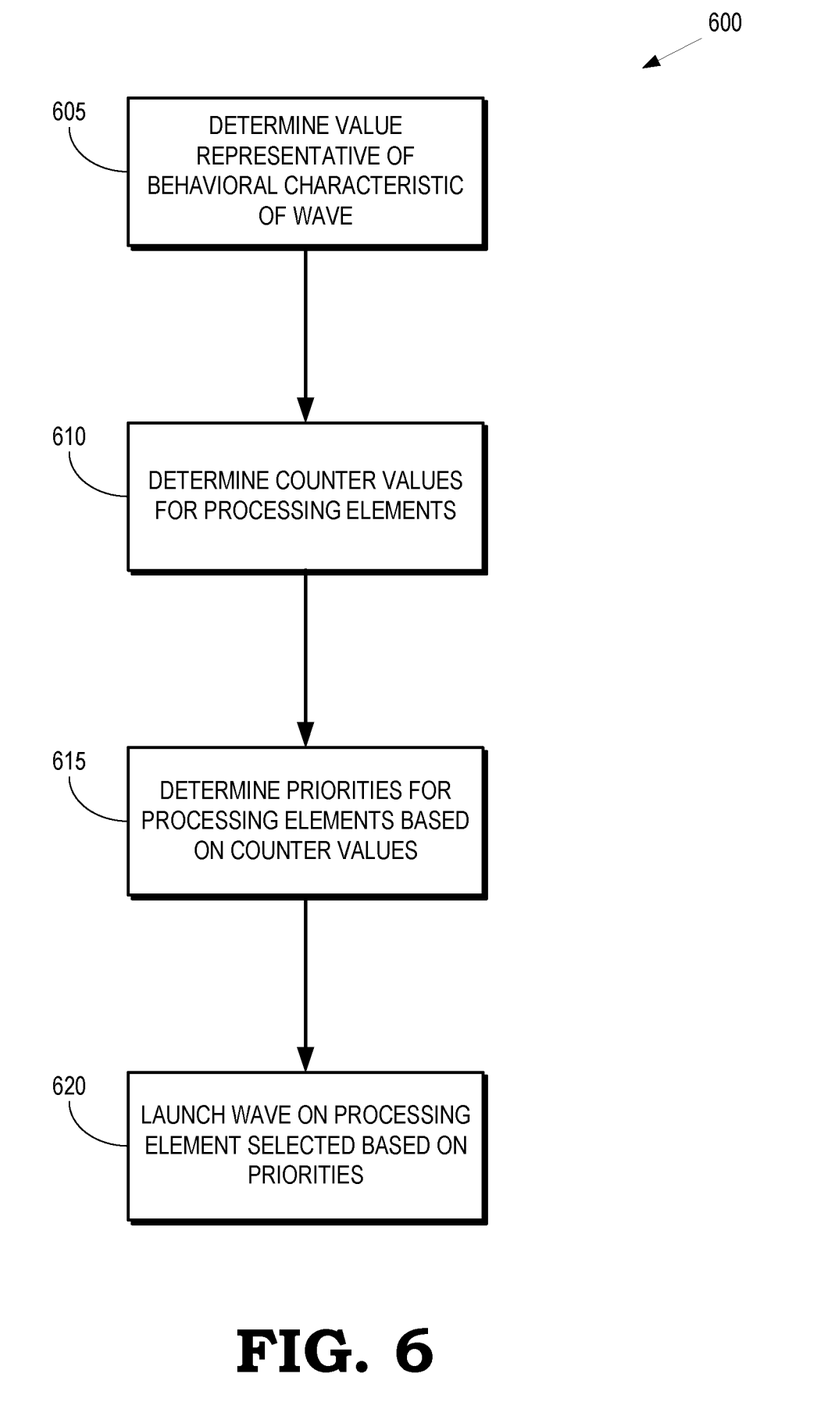
FIG. 6 is a flow diagram of a method of preferentially launching a wave on a processing element that is selected using priorities determined based on behavioral characteristics of the wave according to some embodiments.

FIG. 6 is a flow diagram of a method 600 of preferentially launching a wave on a processing element that is selected using priorities determined based on behavioral characteristics of the wave according to some embodiments. The method is implemented in some embodiments of the dispatcher 135 shown in FIG. 1.

At block 605, the dispatcher determines a value representative of one or behavioral characteristics of a wave that is being considered for dispatch to a processing element. The values of the behavioral characteristics are determined based on information provided by a software developer or using a heuristic to determine the value based on other characteristics of instructions executed by the wave.

At block 610, the dispatcher determines accumulated values of the behavioral characteristics of waves that are currently executing on a set of processing elements. In the illustrated embodiment, the dispatcher determines the accumulated values based on counters associated with the processing elements in the set. As discussed herein, the counters are incremented or decremented based on values of the behavioral characteristics of waves in response to the waves being launched on the processing elements and completing execution on the processing elements, respectively.

At block 615, the dispatcher determines priorities for the processing elements in the set based on the accumulated values represented by the counter values. In some embodiments, the priorities for the processing elements are determined using a sum of products equation. For example, the preference priority for a processing element can be represented as:

$$\text{Preference Priority} = A*Z + B*Y + C*X + D*W + E*V + F*U$$

In this equation, the coefficients A, B, C, D, E, F represent the weights that are applied to each variable to determine the preference priority. Different values of the weights can be used for different types of waves. The variable Z represents a total number of waves allocated to the processing unit, Y represents a number of waves of the same type as the wave that is being considered for launch, X represents a first software definable accumulative load, W represents a second software definable accumulative load, V represents a third software definable accumulative load, and U represents a fourth software definable accumulative load. For example, the accumulator C can be used to model loading of the ALU and the accumulator D can be used to model memory bandwidth loading. The accumulators can also be used to model the loading of internal resources such as VGPRs, LDS, and the like. In some embodiments, more or fewer terms representing more or fewer counters or accumulators are used to define the preference priority of the processing elements.

In some embodiments, the accumulators or wave counters are implemented at multiple levels such as a workgroup level, a compute unit level, and a SIMD level. The preference priorities are therefore replicated at each of the levels and each level computes its own preference priority for receiving each type of request.

Some embodiments of request to launch a wave include a status bit (e.g., from a persistent state register) that defines when the associated contributive load quantity is to be added to the associated accumulators. For example, the value of the status bit could indicate that the accumulators are incremented for each wave of a group or only once per group. Implementing "Per Group" loading factors supports modeling of quantities that remain allocated until the last wave of a group completes such as the LDS. If per group accumulation is enabled, the de-allocation values for each wave except last of the group are zero, i.e. only the last wave would have the full value represented in the de-allocation field. If per wave accumulation is enabled, the register-identified quantity is multiplied by the number of waves in the group before being added into the accumulators.

At block 620, the wave is selectively launched on the processing element that is selected based on the priorities. In some embodiments, the dispatcher determines the processing element that has the highest priority and launches the wave on the highest priority processing element. As discussed herein, selectively launching the wave includes determining whether the accumulator (or accumulators) of the behavioral characteristic values for the processing element have sufficient space to accommodate the wave that is to be launched. Some embodiments of the method 600 therefore incorporate some or all of the method 500 illustrated in FIG. 5.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a plurality of processing elements configured to concurrently execute a plurality of first waves;
    accumulators associated with the plurality of processing elements, wherein the accumulators are configured to store accumulated values representative of behavioral characteristics of the plurality of first waves that are concurrently executing on the plurality of processing elements; and
    a dispatcher configured to determine whether to dispatch or stall second waves to the plurality of processing elements based on comparisons of values representative of behavioral characteristics of the second waves and the accumulated values stored in the accumulators.

2. The apparatus of claim 1, wherein the behavioral characteristics of the plurality of first waves comprise at least one of fetch bandwidths, usage of an arithmetic logic unit (ALU), and number of export operations.

3. The apparatus of claim 1, wherein the accumulators have corresponding maximum values, and wherein the dispatcher is configured to determine available portions of the accumulators that are equal to differences between the maximum values and the accumulated values representative of the behavioral characteristics of the plurality of first waves that are concurrently executing on the plurality of processing elements.

4. The apparatus of claim 3, wherein the dispatcher is configured to stall the second waves in response to the available portions of the accumulators being less than the corresponding values representative of the behavioral characteristics of the second waves.

5. The apparatus of claim 3, wherein the dispatcher is configured to launch the second waves in response to the available portions of the accumulators being greater than or equal to the corresponding values representative of the behavioral characteristics of the second waves.

6. The apparatus of claim 5, wherein the accumulators are implemented as counters, and wherein the counters are incremented by amounts equal to the values representative of the behavioral characteristics of the second waves in response to the second waves being launched by the dispatcher.

7. The apparatus of claim 6, wherein the counters are decremented by amounts equal to the values representative of the behavioral characteristics of the second waves in response to the second waves completing execution.

8. The apparatus of claim 7, wherein a plurality of counters is associated with each compute unit, and wherein the plurality of counters associated with each compute unit are configured to accumulate values for different behavioral characteristics of the first waves that are concurrently executing on the corresponding compute unit.

9. The apparatus of claim 8, wherein the dispatcher is configured to launch the second waves based on comparisons of the values that represent the different behavioral characteristics of the second waves and the plurality of counters associated with each of the plurality of processing elements.

10. The apparatus of claim 1, wherein the dispatcher is configured to assign priorities to the plurality of processing elements based on the corresponding accumulated values, and wherein the dispatcher is configured to launch the second waves on processing elements selected from the plurality of processing elements based on the corresponding priorities.

11. A method comprising:
    concurrently executing a plurality of first waves on a plurality of processing elements;
    accumulating values representative of behavioral characteristics of the plurality of first waves that are concurrently executing on the plurality of processing elements; and
    dispatching or stalling second waves to the plurality of processing elements based on comparisons of values representative of behavioral characteristics of the second waves and the accumulated values stored in the accumulators.

12. The method of claim 11, wherein the behavioral characteristics of the plurality of first waves comprise at least one of fetch bandwidths, usage of an arithmetic logic unit (ALU), and number of export operations.

13. The method of claim 11, further comprising:
    determining differences between maximum values and the accumulated values representative of the behavioral characteristics of the plurality of first waves that are concurrently executing on the plurality of processing elements.

14. The method of claim 13, further comprising:
    stalling the second waves in response to the differences being less than the corresponding values representative of the behavioral characteristics of the second waves; and
    launching the second waves in response to the differences being greater than or equal to the corresponding values representative of the behavioral characteristics of the second waves.

15. The method of claim 14, wherein accumulating the values comprises accumulating the values in counters, and further comprising:
    incrementing the counters by amounts equal to the values representative of the behavioral characteristics of the second waves in response to the second waves being launched by the dispatcher; and decrementing the counters by amounts equal to the values representative of the behavioral characteristics of the second waves in response to the second waves completing execution.

16. The method of claim 15, wherein a plurality of counters is associated with each compute unit, and further comprising:

accumulating values for different behavioral characteristics of the first waves in the plurality of counters; and launching the second waves based on comparisons of the values that represent the different behavioral characteristics of the second waves and the plurality of counters associated with each of the plurality of processing elements.

17. The method of claim 11, further comprising:

assigning priorities to the plurality of processing elements based on the corresponding accumulated values; and launching the second waves on processing elements selected from the plurality of processing elements based on the corresponding priorities.

18. A method comprising:

determining a first value representative of a behavioral characteristic of a first wave; and selectively dispatching or stalling the first wave for execution on one of a plurality of processing elements based on the first value and second values determined by accumulating values representative of behavioral characteristics of a plurality of second waves that are concurrently executing on the plurality of processing elements.

19. The method of claim 18, further comprising:

determining differences between a maximum accumulated value associated with the one of the plurality of processing elements and the second value associated with the one of the plurality of processing elements.

20. The method of claim 19, wherein selectively dispatching or stalling the first wave further comprises:

stalling the first wave in response to the difference being less than the first value; and launching the first wave in response to the difference being greater than or equal to the first value.

* * * * *